United States Patent
Camenisch et al.

(10) Patent No.: US 10,225,258 B2
(45) Date of Patent: Mar. 5, 2019

(54) ANONYMOUSLY SHARING RESOURCES BASED ON SOCIAL NETWORK USER DATA

(71) Applicant: INTERNATIONAL BUSINESS MACHINES CORPORATION, Armonk, NY (US)

(72) Inventors: Jan Camenisch, Thalwil (CH); Guenter Karjoth, Waedenswil (CH); Gregory Neven, Oberrieden (CH); Franz-Stefan Preiss, Zurich (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/033,128

(22) PCT Filed: Oct. 31, 2014

(86) PCT No.: PCT/IB2014/065735
§ 371 (c)(1),
(2) Date: Apr. 29, 2016

(87) PCT Pub. No.: WO2015/063729
PCT Pub. Date: May 7, 2015

(65) Prior Publication Data
US 2016/0269416 A1    Sep. 15, 2016

(30) Foreign Application Priority Data
Nov. 1, 2013 (GB) .................................. 1319353.7

(51) Int. Cl.
*G06F 7/04*    (2006.01)
*H04L 29/06*    (2006.01)

(52) U.S. Cl.
CPC .......... *H04L 63/102* (2013.01); *H04L 63/065* (2013.01); *H04L 63/083* (2013.01); *H04L 63/126* (2013.01)

(58) Field of Classification Search
None
See application file for complete search history.

(56) References Cited

U.S. PATENT DOCUMENTS 8,615,552 B2   12/2013   Shah
8,914,441 B2   12/2014   Quintuna
(Continued)

FOREIGN PATENT DOCUMENTS

CN   102035846 A   4/2011
CN   103369089 A   10/2013
(Continued)

OTHER PUBLICATIONS

Melanson, "Mappr Brings Foursquare Check-ins to Facebook Groups", readwrite.com, Oct. 20, 2010.
(Continued)

*Primary Examiner* — Brandon S Hoffman
(74) *Attorney, Agent, or Firm* — Amin, Turocy & Watson, LLP

(57) ABSTRACT

A method for controlling access to a resource of an owner of the resource is provided. The owner can be a user of a resource computer system. The access control can be based on social network data of a social network system and/or on an owner token relating to the owner or a requester token relating to a requester requesting access to the resource and an access control policy. The owner token and the requester token can be received by the system to determine by the social networking system whether access to the resource is to be granted based on the content of the owner token and the requester token. A social network identity of the owner
(Continued)

and a social network identity of the requester may only be determinable by the social network system.

20 Claims, 5 Drawing Sheets

(56) References Cited

U.S. PATENT DOCUMENTS

| | | | |
|---|---|---|---|
| 9,286,642 B2 | 3/2016 | Hochberg et al. | |
| 2012/0136936 A1* | 5/2012 | Quintuna | G06F 21/604 709/204 |
| 2013/0290226 A1* | 10/2013 | Dokken | G06N 5/02 706/12 |
| 2014/0189808 A1* | 7/2014 | Mahaffey | H04L 63/0853 726/4 |

FOREIGN PATENT DOCUMENTS

| | | |
|---|---|---|
| GB | 2481426 A | 12/2011 |
| GB | 2498708 A | 7/2013 |
| JP | 2007226470 A | 9/2007 |
| JP | 2008061197 A | 3/2008 |
| JP | 2013008345 A | 1/2013 |
| WO | 2010061847 A1 | 6/2010 |
| WO | 2011140263 A1 | 11/2011 |
| WO | 2012089007 A1 | 7/2012 |
| WO | 2013098483 A1 | 7/2013 |
| WO | 2013142399 A1 | 9/2013 |
| WO | 2013145518 A1 | 10/2013 |
| WO | 2014033666 A1 | 3/2014 |

OTHER PUBLICATIONS

Badley, "Hacking OAuth 2 Avoiding Security Pitfalls in your Deployment", RSA Conference 2013, Jan. 25, 2013.

Camenish, et al., "Anonymously Sharing Flickr Pictures with Facebook Friends," WPES'13, Nov. 4, 2013, Berlin, Germany, Copyright 2013 ACM 978-14503-2485-4/13/11 . . . $15.00., http://dx.doi.org/10.1145/2517840.2517861, 11 pages.

Camenish, et al., "Anonymously Sharing Flickr Pictures with Facebook Friends," Workshop on Privacy in the Electronic Society '13 Berlin Germany Copyright 2013 ACM 0-12345-67-8/90/01, 10 pages.

Camenish, et al., "Using Electronic Social Network Profile Data for Access Control in Multi-User Computing Systems," Feb. 13, 2013, 4 pages.

Camenish, et al., "Using Electronic Social Network Profile Data for Access Control in Multi-User Computing Systems," May 15, 2013, 9 pages.

Camenish, et al., "Using Electronic Social Network Profile Data for Access Control in Multi-User Computing Systems," Jul. 8, 2013, 11 pages.

* cited by examiner

ANONYMOUSLY SHARING RESOURCES BASED ON SOCIAL NETWORK USER DATA

CROSS-REFERENCE TO RELATED APPLICATION

This application claims priority under 35 U.S.C. § 371 from PCT Application PCT/IB2014/065735, filed on Oct. 31, 2014, which claims priority from United Kingdom Patent Application No. 1319353.7 filed Nov. 1, 2013. The entire contents of both applications are incorporated herein by reference

FIELD OF THE INVENTION

The invention relates generally to a method for controlling access to a resource. The invention relates further to an access control system for controlling access to a resource of an owner of the resource, a data processing program, and a computer program product.

BACKGROUND

Many individuals in today's society maintain profiles in one or more social networking systems (SNS) such as Facebook, LinkedIn, or Foursquare, Flickr, Twitter and the like. Such an SNS allow its users to establish and maintain personal friend or professional relationships with other users of the same SNS. Many SNS' also allow users to divide their friends into friend groups, e.g., best friends, work colleagues, family, etc., so as to restrict access to certain profile data to members of a particular group or subgroup. The establishment and maintenance of an SNS profile, including friend relationships and groups, is a continuous and very time-consuming process, which also entails a lock-in effect that becomes stronger the more friends a user maintains. At the same time, numerous competing SNS' do exist and typically not all relationships can be managed within a single SNS. Therefore, users of an SNS can be forced to maintain relationships in different SNS'.

However, a privacy preserving re-use of relationships within one SNS in another SNS is not possible. Moreover, a major problem in this context is that users cannot utilize the friend relationships and groups that are defined in an SNS for access control outside of this SNS, such as in another computer system like a multiuser computing system or in other SNS'.

For example, consider a user Alice who has, e.g., a Facebook or Flickr profile with numerous carefully selected friends as well as several well-maintained friend groups. When Alice joins another SNS such as, e.g., Foursquare—where users can, e.g., indicate their physical presence at venues such as bars, restaurants or shops via a check-in—Alice might want only her Facebook friends, or the members of one of her Facebook friend groups, to access her (privacy-sensitive) Foursquare check-ins. However, current SNS do not allow for such kind of access control; they only allow for access control rules that are based on SNS-internal profile data, that is, SNS profile data that resides within each SNS whose profile data access is controlled. In the above example, a conventional and technically feasible solution for this access control problem would be to allow, e.g., Foursquare to query Alice's Facebook friends: given a user Bob who has a profile on Facebook and Foursquare, on Bob's login to Foursquare, Foursquare retrieves Alice's current Facebook friend list and determines whether Bob is a Facebook friend of Alice. A drawback of such a conventional solution, however, is that Foursquare learns all Facebook friends of Alice, which compromises Alice's privacy.

Additionally, to enable such a solution in the first place, it is necessary that both Alice and Bob make their Facebook identities (e.g., their Facebook usernames) known to Foursquare so that Foursquare and its provider (a) knows whose Facebook user's friends to query, and (b) can recognize Bob in Alice's friends list. This identity disclosure is another drawback of the conventional solution.

Related technology is, e.g., disclosed in WO 2011/140 263 A1. In this document, the following has been disclosed: methods and systems for providing access to information and connections associated with or derived from social graphs, including social networks, professional networks, and content sharing and public sights.

In WO 2012/089 007 A1, a system for providing shared content to a group of users in a multi-platform environment is disclosed. The system allows making digital content items available across platforms.

Hence, there is a need to more intelligent access resources on a computer system without having to use a dedicated access control system, e.g., on the computer system.

SUMMARY OF THE INVENTION

This need can be addressed by a method for controlling access to a resource, an access control system for controlling access to a resource of an owner of the resource, a data processing program, and a computer program product, according to the independent claims.

According to an embodiment of one aspect of the invention, a method for controlling access to a resource can be provided. The resource can be a resource of an owner of the resource. The owner can be a user of a resource computer system, and the access can be based on data of a social networking system. The access control can also be based on an owner token relating to the owner, a requester token relating to a requester requesting access to the resource and an access control policy.

Additionally, a resource owner identity and the access control policy can be encoded in the owner token and the resource requester identity can be encoded in the requester token. The owner token and the requester token can be received by the social networking system to determine by the social networking system whether access to the resource on a resource computer in particular by the requestor—can be granted based on the content of the owner token and the requester token.

According to an embodiment of another aspect of the invention, an access control system for controlling access to a resource of an owner of the resource can be provided. The owner can be a user of a resource computer system. The access can be based on data of a social networking system, wherein the access control can also be based on an owner token relating to the owner, a requester token relating to a requester requesting access to the resource and, an access control policy.

Beside the access control policy, a resource owner identity can be encoded in the owner token. The resource requester identity can be encoded in the requester token. The owner token and the requester token can be sent from the resource computer system to the social networking system to determine whether access to the resource is to be granted based on the content of the owner token and the requester token.

It can be noted that this way privacy of the owner and the requester in particular the social network identities of the owner and the requestor—on the social networking system can be preserved because these identities can only be determinable by the social networking system.

According to an embodiment of another aspect of the invention there is provided a social networking system including a storage for storing social network data, wherein the social networking system is configured to: generate a secret group signing key for an owner of a resource of a resource computer system, generate a secret group signing key for a requester to the resource, and receive an owner token and a requester token from the resource computer system to determine whether access to the resource is to be granted based on the content of the owner token and the requester token, wherein an access control policy is encoded in the owner token, and wherein, beside the access control policy, a resource owner identity is encoded in the owner token and a resource requester identity is encoded in the requester token.

According to an embodiment of another aspect of the invention there is provided a method for controlling access to a resource of an owner of the resource, the owner being a user of a resource computer system, wherein the access control is based on data of a social networking system, the method including, in the social networking system the steps of: generating a secret group signing key for an owner of a resource of a resource computer system, generating a secret group signing key for a requester to the resource (308), receiving an owner token (314) and a requester token from the resource computer system to determine whether access to the resource (308) is to be granted based on the content of the owner token (314) and the requester token, wherein an access control policy is encoded in the owner token (314), and wherein, beside the access control policy, a resource owner identity (310s) is encoded in the owner token (314) and a resource requester identity is encoded in the requester token.

BRIEF DESCRIPTION OF SEVERAL VIEWS OF THE DRAWINGS

Preferred embodiments of the invention will now be described, by way of example only, and with reference to the following drawings.

DETAILED DESCRIPTION OF THE INVENTION

Figure 1:
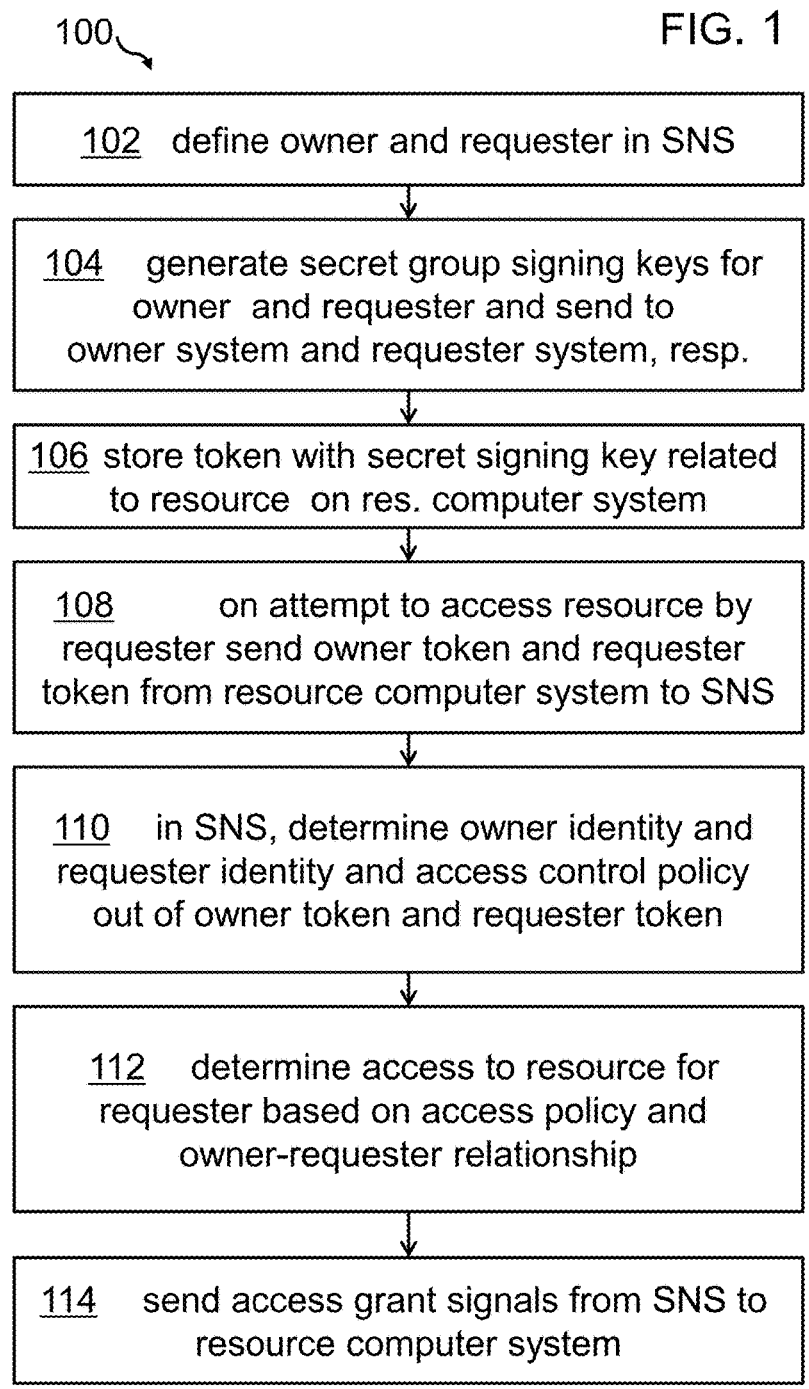
FIG. 1 shows a block diagram of steps of the method for controlling access to a resource.

In the context of this description, the following conventions, terms and/or expressions can be used:

The term "access control" can denote a selective restriction of access to a resource, e.g., a file in a computer system a URL (Universal Resource Locator), used to specify pages on the Internet, or the like. The act of accessing can mean consuming, entering or using specific resources, in particular, reading, and in exceptions also updating, writing and deleting. In some cases it can also mean a physical access to a lock for securing physical devices, like rooms, buildings, cars, storage systems and the like. Typically, a user ID and/or a passport can be required for a grant of access to the resource.

The term "social networking system" (SNS) can denote a system delivering a social networking service based on an Internet platform allowing, defining and maintaining social networks of social relations among registered users who, e.g., share interests, activities, backgrounds of real life, e.g. job related connections. A social networking service can consist of an electronic, Web- and browser based representation of a user a user profile or identity his/her social links to other users, and a variety of additional services. The social networking service can be executed on one or more computer systems or, in short, an SNS. As examples of today's known social networking systems, the following can be named: Facebook, LinkedIn, Xing, Google+, Twitter, Flickr, Foursquare, just to name a few.

The term "resource" can denote typically resources within a computer system, e.g., a file (e.g., an image file, a text file a sound file, a video file, or the like), a directory, a URL, or any other information component to which access can only be granted selectively, e.g., protected by a password.

The term "resource computer system" can denote a computer system having stored a resource owned by the resource owner or simply owner. The resource owner can have uploaded the resource to the resource computer system or can control the resource in another way. A "resource" in the context of this disclosure can also be a physical resource, like access to a door of a building or the access to a physical lock of any kind.

The term "owner" can denote a person, a user or, its electronic identity enabled to allow or restrict access to "his/her" resources. In this context, a "requester" can denote a person or its electronic identity requesting access to resources not "owned" by the requester.

The term "owner token" can denote a tuple of information items—optionally encrypted—which can be related to an owner of a resource. The resource can be located on a system different to the SNS. This difference system can be another multiuser system like, e.g., a second SNS or the resource computer system.

The term "requester token" can denote a tuple of information items—optionally encrypted—which can be related to a requester.

The term "relationship" can denote a defined logical link between two users of an SNS. However, a relationship can also be interpreted more abstract like a defined membership to a group. Another option can be a membership to a community which cannot explicitly be defined like, e.g., all users of the SNS living in the same city, all users of the SNS having visited the same defined event, all users of the SNS being born in the same year or the same country, or all users of the SNS working for the same company, or the like.

The term "access policy" can denote a control rule defining who or which system can have access to a resource. Going back to the definition of relationship, users of the SNS having defined identities in the SNS with defined relationships can define one way of access control. If two identities can be linked as, e.g., "friends" the relationship can be defined explicitly and the defined friend by identity name can have access to the resource of the owner. It can also be possible to allow access to the resource of the owner by "all friends", meaning all entities requesting access to the resource being linked or networked to the user or owner of the resource, can be granted access to the resource. Those without a link to the user or owner cannot be granted access. On the other side, access can also be granted to systems representing the requester when the owner identity and the requester identity in the SNS share a common characteristic, like, e.g., having the same home town, working for the same company, having been at the same party, being born in the same year, sharing the same hobbies or any other characteristic being stored in the SNS and characterizing an individual.

The term "privacy" can denote several characteristics related to a user of an SNS or, its profile or, other data related to the user, e.g., actual location data. In particular, preserving privacy can ensure any requesting computer system cannot tell which user identities registered with the SNS created an owner or requester token, or even whether owner or requester tokens were generated by the same or by different users. For preserving privacy, it can be required that an owner token can leak no information about the relationship. From a more native standpoint: no profiling or relationship data from the SNS can be exported to another computer system, e.g., another SNS, even if the other SNS can use the relationship information of the first SNS for access control to resources on the other computer system. Finally, also over time, the other computer system or other SNS cannot learn their relationships, even if a series of access control related relationship accesses to the first SNS can have been made.

The term "group signature" can denote the ability for a member of a group to anonymously sign a message using a digital signature on behalf of the group. A digital signature can be a mathematical scheme for demonstrating the authenticity of a digital message or document. This concept goes back to an idea by David Chaum and Eugene van Heyst and is generally known by a skilled person. A group signature concept always requires a group manager being in charge of editing group members and having the ability to reveal the original signer. Details are discussed below.

The term "OAuth Authorization Framework", in particular in version 2.0 or higher, can denote an authorization framework and a billing a third-party application or user to obtain limited access to an HTTP service. OAuth has an open standardized framework. It can provide a method for clients to access some of the resources on behalf of a resource owner which can be a different client. As in the case of the group signature, also here user credentials—such as username and password—cannot be shared. Details are discussed below.

The term "access control policy" can define rules under which an owner can allow access to his resources by defined other users or systems.

An "owner system" can be defined as a computer system controlled by the owner of the resource; and a "requester system" can be defined as a computer system operated by a requester requesting access to the resource.

The proposed method for controlling access to a resource can offer a couple of advantages:

Using the method for controlling access can enable a centralization of relationship data, in particular, of abstract relationship data in one (main) SNS and reusing these relationships and other SNS' for an access control to the resource stored on a resource computer system. Thus, maintenance of relationships can become much easier because the profile data can be maintained only in a single SNS rather than in multiple systems. This can lower the barrier for users to enter new SNS' because relationships cannot be required to be maintained in the new SNS again.

As the evaluation phases for access control policies can be expressed in terms of profile data in the main SNS, maintaining the profile data in the main SNS can, at the same time, maintain control access permissions that can be dependent on these profile data on a different SNS or, access to resources simply another computer system. That is, more defined relationships—in particular, friend relationships or friend groups or other relationships as discussed above—on the main SNS can have an immediate or instantaneous effect in terms of access permissions on all dependent SNS or all other dependent computer systems, e.g., the resource computer system.

This can lower SNS entry barriers as no redefining of relationships in a newly joint SNS can be necessary because existing relationships can be reused. This can apply at least to those users who have accounts in the SNS and the resource computer system.

Drawing on these accesses to the main SNS, the requesting SNS or other resource computer systems cannot learn the identities of the profile owners in the main SNS. Privacy is completely preserved. To avoid the involved re-establishment of relationships and potentially re-definition of groups in a newly joined SNS, it can no longer be required to give up privacy by allowing access to the entire profile information—including relationships to other users—to a good community joined SNS or, for sharing resources on another computer system. As access to profile information can now easily be controlled based on relationships established in another SNS. There is no longer the obstacle of re-establishing relationships and groups and thus, no longer the need of the making of personal profile information public.

Privacy can be guaranteed under different aspects. If the resource computer system can be operated by a service provider SP and the SNS is operated by a service provider SN the following privacy requirements can be fulfilled:

Anonymity: It can be guaranteed that SP cannot tell which user identity registered with SN created an owner or requester token, or even whether two owner or requester tokens were generated by the same or by different users. It can be guaranteed that the owner token leaks no information about the policy to SP.

Resource Secrecy: It can be guaranteed that the owner token, requester token, and linking token do not leak any information to SN about the resource res for which the tokens were generated.

Token Unforgeability: It can be guaranteed that a cheating user cannot get access if he does not satisfy the policy. At the same time, we want to prevent a cheating service provider SP from performing more policy evaluations than those that are strictly required to make access decisions. This means that SP should not be able to modify the policy created by the resource owner to evaluate policies on users that never requested access to any resource at all, nor to evaluate a policy on a user who never requested access to a resource to which this policy was associated. Technically, these restrictions all translate into the unforgeability of owner and requester tokens pointing to honest users when extracted through an extract algorithm.

Provider Security: It can be ensured that no adversary is able to produce tokens that pass the owner token verification algorithm and that SP can use to create a valid linking token, but for which an extraction fails.

In the following, additional enhanced embodiments will be described. According to one embodiment of the method, the access control policy can only be determinable by the SNS. The resource computer system cannot be able to determine the access control policy. This can protect privacy of the owner and the requester. The resource computer cannot "learn" anything about the relationship between the owner of the resource and the requester.

According to an enhanced embodiment of the method, the owner token can be related to the resource on the resource computer system. This can imply that the resource and the owner token can be stored in conjunction or, that at least a relationship can be established between the resource and the owner token on the resource computer system or its storage.

One embodiment of the method can also include determining an owner identity and a requester identity within the SNS out of the owner token and the requester token, in particular in the SNS, determining an access control policy the owner token is associated with—in particular, either in case of group signature as part of the owner token or, in case of OAuth, as stored in the SNS—and evaluating the access control policy on the basis of the owner identity and/or the requester identity in the SNS. This same embodiment can also include sending a result of the evaluation from the SNS to the resource computer system. This can be performed in form of an indicator or grant signal whether to grant access to the resource or not.

According to an additional embodiment of the method, the owner token and the requester token include a group signature wherein a related signature group is managed by the SNS. Alternatively, the group signature can be managed by a related independent system to the SNS. This way, the owner and the requester are linked together as a group reflecting a connection between the owner of the resource and the requester. However, outside the SNS the group cannot be detectable, in particular, not in the resource computer system.

Additionally, the method can include in one embodiment, obtaining by an owner system and/or a requester system a user-specific secret group signing key involving the SNS. The users of the SNS can be the owner and the requester. The specific secret group signing key can be individual for each user. It can be generated during a setup of the user accounts in the SNS. However, it can also be creatable at a different, later or earlier point in time. It can be generated through an execution of a protocol between the SNS and the individual users or user system, at which end the user can receive its secret group signing key. Thus, the secret group signing key can be stored on a computer system the owner system and/or the requester system, respectively of the owner or the requester, respectively.

According to an enhanced embodiment of the method, the group signature included in the owner token and/or the requester token can be a result of signing a message, in, particular any message under the secret group signing key of the owner and/or the requester. The content of the message cannot play any role. However, the owner identity of the owner can be extracted from the token.

According to a further enhanced embodiment of the method, the above-mentioned message signed in an owner token can include the access control policy in plain text or in encrypted form. It can be encrypted under the public key of the SNS. The requester token can be generated before or "on the fly" during requesting access to the resource.

According to an alternative embodiment of the method, the owner token and/or the requester token can include an OAuth access token based on the OAuth Authorization Framework, in particular the OAuth 2.0 Framework.

According to a further embodiment of the OAuth based embodiment of the method, the social networking system can act as authorization server for the owner token and/or the requester token which can, in particular, be both OAuth access tokens, and wherein the SNS can store the owner token together with the owner identity and the access control policy and/or the requester token together with the requester identity. This storing can be performed in the SNS or a related additional system or storage.

Furthermore, embodiments can take the form of a computer program product, accessible from a computer-usable or computer-readable medium providing program code for use, by or in connection with a computer or any instruction execution system. For the purpose of this description, a computer-usable or computer-readable medium can be any apparatus that can contain means for storing, communicating, propagating or transporting the program for use, by or in a connection with the instruction execution system, apparatus, or device.

The medium can be an electronic, magnetic, optical, electromagnetic, infrared or a semi-conductor system for a propagation medium. Examples of a computer-readable medium can include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

It should also be noted that embodiments of the invention have been described with reference to different subject-matters. In particular, some embodiments have been described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, but to which the invention is not limited.

In the following, a detailed description of the figures will be given. All instructions in the figures are schematic. Firstly, a block diagram of an embodiment of the inventive method for controlling to a resource of an owner. Afterwards, further embodiments of the method as well as the related access control system for controlling access to the resource will be described.

FIG. 1 shows a block diagram of steps of the method for controlling access to a resource. Firstly, a user, namely an owner of the resource and a requester of the resource have to be defined, 102, in the SNS, wherein the resource can be stored on another computer system, namely, the resource computer system. Upon registration a secret group signing key for the owner and the requester can be generated, 104, respectively. These secret group signing keys can be sent from the SNS to a respective owner system and a respective requester system. A token, including the secret group signing key of the owner and an access control policy can be stored, 106, together with the resource on a resource computer system. This process can be controlled by the owner of the resource via the owner system.

On an attempt to access the resource by the requester on the resource computer system, the owner token and the requester token can be sent from the resource computer system to the SNS, 108. Here, in the SNS, the identities of the owner and a requester can be determined, 110, based on the secret group signing key of the owner and the requester as well as an access control policy based on the received token. Again, based on the owner identity, the repressed identity, the access control policy and a defined or abstract relationship between the owner and the requester in the SNS, a grant signal can be generated, 112, and it can be sent back, 114, to the resource computer system. Here, the grant signal can be used to allow access to the resource.

Figure 2:
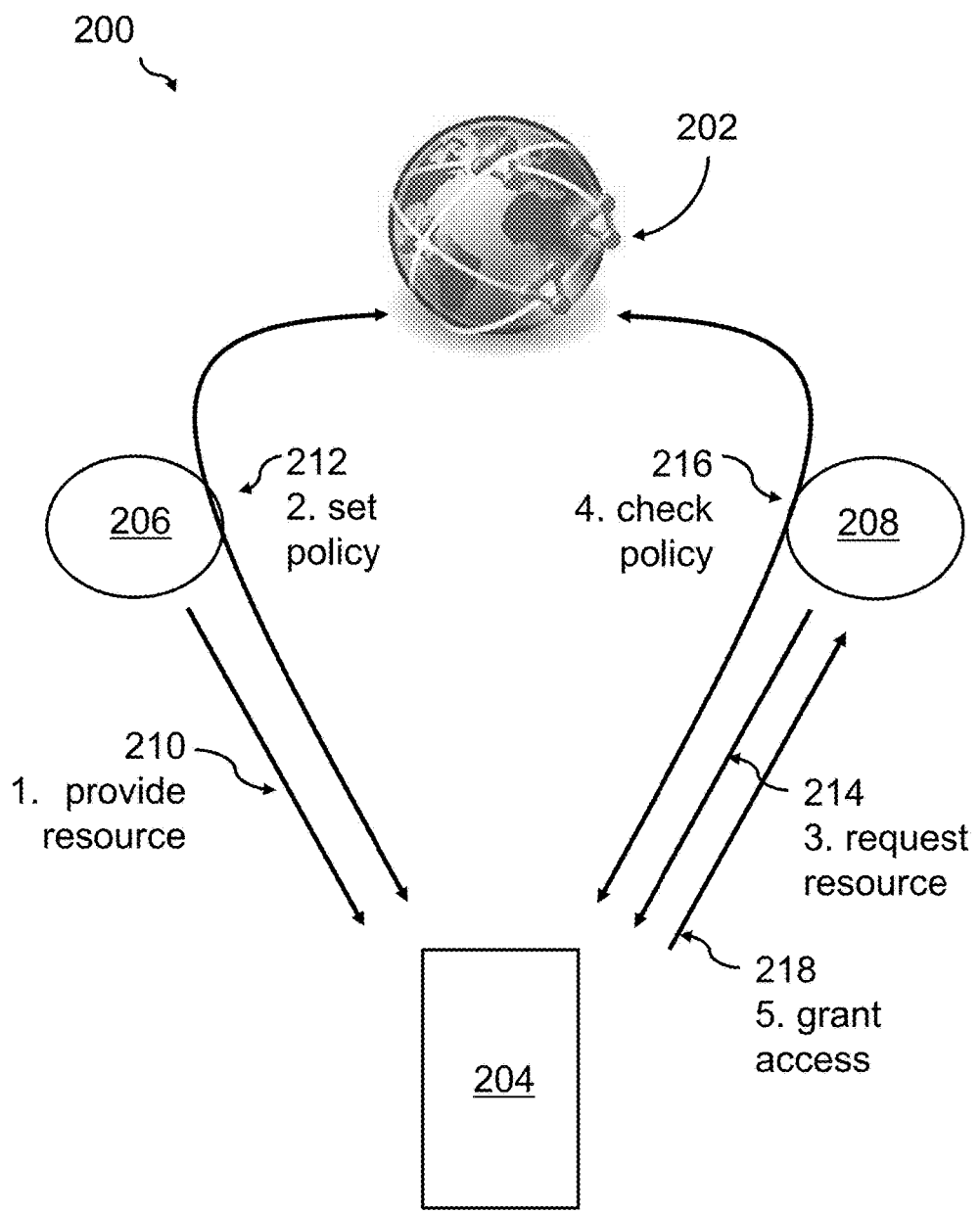
FIG. 2 shows a block diagram of involved entities: a social networking system, a computer system having stored the resource, an owner system, and a requester system.

FIG. 2 shows a typical scenario and general process flow of accessing a resource on the resource computer system 204. There can be a number of users 206 out of all registered users with a social networking service 202—also here denoted as SN. One of many of available social networking services 202 can be, e.g., Facebook. Here, the users 206 can have accounts. On SN 202, users can manage their friend relationships and groups. SN can also know other information about its users, which might be relevant to this scenario. A user Ui can own and provide, a certain resource (e.g., a collection of images) and can want to share it with his friends by depositing or providing, 210, it (step 1 and FIG. 2) on a resource computer system SP of a service provider such as, e.g., Flickr. It can be noted that Facebook as well as Flickr are just used as examples. Any other SNS 202 or resource computer system SP 204 can be used to perform the method of the current disclosure. Because the user Ui 206 does not want to share the resource with all of his friends, but only those who satisfy certain criteria, he can create, 212, an access policy plc describing to whom access to the resource can be allowed. He then can associate the access control policy (already suitable encryption thereof) with the resource at SP, step 2. As the user Ui 206 can manage his friends on SN 202, the policy would be evaluated by SN 202, but will be enforced by SP 204. No assumption is made about the format of the policy itself.

If a user Uj can request, 214, access to the resource (step 3), then SP, SN and Uj interoperate to determine whether Uj should be granted access (step 4, 216, 218). Finally, user Uj 208 can access the resource (step 5). In this process, SP can only learn whether or not Uj can satisfy the policy plc as evaluated by SN. In this basic scenario, it can be assumed for simplicity that users 206, 208 are known under their accounts or identities with SN; whether they also can have accounts with SP is not relevant. User Ui 206 can inform user Uj 208 by any communication method: by sending an e-mail, sending the link on a blog, on his wall on SN or, Uj 208 can just regularly visit the page of Ui 206.

Before going into more detail involving the remaining figures, some general ideas about the proposed social-network-system-based access control can be discussed. The participants or users 206, 208 in an SNS-based access control system is a social network SN 204 where users 206, 208 can manage their profiles and friends lists. A number of users U1, . . . , Un who are registered with SN, and a service provider SP 204 which users 206, 208 use to host and share resources with other users. Users 206, 208 can or cannot have accounts with SP 204. Since all access control decisions can be taken based on the users' 206, 208 identities with SN 204, this is irrelevant for the here proposed system. For simplicity, it can be considered i to be the user name of user Ui with SN. In the following, first the high-level idea of the system can be described then, formal definitions of its algorithms can be provided.

To setup the system, SN 204 can run a key generation protocol and can publish the system parameters of the scheme and the SN's public key. To be able to share or to access a resource, a user Ui 204 can need to first run a registration protocol with the social network SN from which the user can obtain some registration information ski (the user's secret key).

Next, when a user Ui (owner of the resource) can want to deposit some resource with description res (this could for instance be the resource URL), he can use ski and res to generate what can be called the owner token of for some access control policy plc. Ui can then deposit the owner token and the resource with SP, who can check the validity of the token, and then he can send res by some adequate means to his friends.

Now, when a user Uj 208 (requester of the resource) can want to access the resource with description res, he can generate a requester token rt for the resource res using his skj and can send rt to SP 204 as part of the request for the resource. SP 204 can use ot and rt to generate what can be called a linking token lt proving that the ot and rt relate to the same resource, and then send the triple (ot, rt, lt) to SN. The linking token will ensure to SN 202 that the requester token rt is indeed requesting access to the resource for which ot defines the policy in such a way that SN does not learn information about the resource. The generation of the linking token can also include a verification of the requester token. Given these three tokens, SN can extract the policy plc and the user's identities Ui and Uj. Thus, in some sense, by generating the requester and the owner tokens, Ui and Uj authorize SP 204 to query SN 202 for the evaluation of the policy plc with respect to their accounts with SN 202. Next, SN 202 can evaluate whether or not Uj satisfy the policy plc with respect to Ui and can send the result ("yes" or "no") back to SP 204, who will allow or deny access to the resource based on the result.

To protect the privacy of users 206, 208, it can be guaranteed that SP 204 and SN 202 do not learn more information than strictly necessary, i.e., SN 202 should not learn any information about the resource, while SP 204 does not learn the users' 206, 208 identities with SN nor any information about the access policy. For security, it can be ensured that users 206, 208 who do not satisfy a policy cannot forge requester tokens that will give them access, and that the service provider SP 204 cannot forge owner tokens to evaluate policies with respect to Ui that were not created by Ui.

As mentioned already, it can also be ensured that owner tokens and requester tokens are somehow "linked" to the resource, so that they cannot be reused to protect or obtain access to a different resource. SN 202 should be able to check that the owner token and requester token were created for the same resource, but at the same time, SN 202 should be able to learn anything about res itself. These seemingly contradicting requirements can be addressed by letting users 206, 208 send to SP 204, along with each owner or requester token, also linking information oli or rli, respectively. The SP 204 cannot forward oli and rli to SN 202, but instead generate a linking token lt from oli and rli that essentially strips all information about res itself, but still allows SN to verify that ot and rt were indeed created for the same resource.

The SNS-based access control system can consist of five procedures: Setup, Register, OTGen, OTVf, RTGen, LTGen, and Extract. These procedures can be defined as follows (for comprehensibility reasons, reference numbers are suppressed in the following sections):

Setup: A probabilistic algorithm to generate the keys for SN. On input of a security parameter I, the algorithm can output the secret skSN and public key pkSN.

Register: A probabilistic protocol between a user Ui and SN. The user's input can be (i, pkSN) and SN's input can be (i, skSN). The user's output can be ski. It can be assumed that the protocol can fail for an index i if it was already run for this index.

OTGen: A probabilistic algorithm allowing a user Ui to generate an owner token ot together with linking information oli for resource res ⊏ {0,1} stored by SP with access control policy plc ⊏ {0,1} to be verified by SN. They are computed as (ot, oli)⊏ R OTGen(pkSN, ski, plc, res).

OTVf: A deterministic algorithm allowing SP to verify an owner token ot and its linking information oli with respect to res and SN, i.e., 0/1 L(pkSN, ot, oli, res).

RTGen: A probabilistic algorithm for allowing a user Ui to generate a requester token rt together with linking information rli for a resource res hosted by SP by computing (rt, rli) ⊏ R RTGen(pkSN, ski, res).

LTGen: A possibly probabilistic algorithm that can combine the policy linking information oli and access linking information rli into a linking token lt, i.e., lt⊏ R LTGen (pkSN, ot, oli, rt, rli, res). It can return lt=Null/not valid to indicate failure.

Extract: A deterministic algorithm for allowing SN to extract the user identities and policies associated with a triple of a policy, an access, and a linking token, i.e., (i, j, plc)⊏ Extract(skSN, ot, rt, lt). It returns ⊥ if the tokens are malformed. SN can subsequently check whether users i and j satisfy the policy plc. Note that this algorithm does not require res as input. In fact, it can be required that ot, rt, lt do not leak information about res.

Group Signature Embodiment

The next section will describe the used group signature concept. One embodiment of the social-network-system-based access control scheme can be based on group signatures, which allow a group of signers to anonymously sign messages in the name of the group such that only a group manager can figure out the exact signer. The role of the group manager can be played by SN, who can give out a signing key to each user that registers at SN. The owner of a resource Ui can attach an access policy to the resource by encrypting the policy under SN's public key, creating a commitment to an identifier of the resource res, and computing a group signature on the ciphertext and the commitment. To make sure that the ciphertext cannot be separated from the owner token and used in combination with another group signature, a known technique can be used involving one-time signatures to bind the ciphertext to the token. The owner token can contain the group signature, the ciphertext, the commitment, a one-time signature on all three of these, and the public key to the one-time signature scheme; the linking information consists of the opening information to the commitment. When user Uj can request access to a resource, he also commits to the resource and signs the commitment using his group signing key. The service provider SP can verify all signatures in the tokens and checks that both commitments open to the resource identifier res. It then can create the linking token by computing a non-interactive zero-knowledge proof that the commitments in the owner token and in the requester token open to the same resource. SN can first verify all signatures and the zero-knowledge proof, extracts the user identities i, j by opening the group signatures, and can decrypt the access policy. It can then evaluate whether Uj satisfies the policy with respect to Ui and send the access decision back to SP.

Group signatures allow a signer to anonymously sign messages in name of a whole group of users, who obtain their secret signing keys from a group manager. The group manager is responsible for the initialization of the group and for the admission of group members. Anyone can verify that the message was signed by a valid group member using the group's public key, but only the group manager (or a dedicated opener) can recover the exact identity of the signer. Depending on whether the signing keys are pre-computed during the initialization phase for all users, or dynamically generated whenever a new user joins the group, a group signature scheme is called static or dynamic. Here, for simplicity reasons the method will be described in terms of static group signatures, but the method easily extend to the dynamic case. A group signature scheme can consist of the following algorithms:

GKg: A probabilistic algorithm that the group manager can use on input of a security parameter t and the number of users n to generate the group public key gpk, signing keys gsk1, . . . , gskn, and the opening key ok. It publishes gpk, hands signing key gski to user Ui, and keeps ok secret.

GSign: A signing algorithm that user Ui runs on input of a signing key gski and a message msg to create a group signature ⊏.

GVerify: A deterministic verification algorithm that the verifier runs on input of the group public key gpk, a message msg and signature ⊏ and returns one if the signature is valid and returns zero otherwise.

GOpen: An opening algorithm that on input of the opening key ok, a message msg and a signature ⊏, returns the index i ⊏ {0, . . . , 1} of the user who created the signature or Null/not valid to indicate failure.

GVerify: A deterministic verification algorithm that the verifier can run on input of the group public key gpk, a message msg and signature ⊏ and can return one if the signature can be valid and returns zero otherwise.

GOpen: An opening algorithm that on input of the opening key ok, a message msg and a signature ⊏, returns the index i ⊏ {0, . . . , 1} of the user who created the signature or Null/not valid to indicate failure.

Correctness requires that for all l, n, i ⊏ N and for all msg ⊏ {0, . . . , 1}* one has GVerify(gpk, msg, GSign(gski, msg))=1 and GOpen(ok, msg, GSign(gski, msg))=i with probability one when (gpk, gsk1, . . . , gskn, ok)⊏ GKg(l,n).

Security of group signature schemes can consist of two properties, namely anonymity and traceability. Anonymity essentially guarantees that nobody except the group manager can tell which signer created a particular signature.

Public Key Encryption with Labels

Traceability can guarantee that a valid group signature can always be traced back to a user whose signing key was used in the creation of the group signature. This implies unforgeability, since the ability to create a valid signature without access to any signing keys would violate traceability. Both requirements are fulfilled.

Public-key encryption with labels is similar to standard public-key encryption, but one can bind a label to a ciphertext in a non-malleable way. Labels can be added to any standard public-key encryption scheme by appending the label to the message, but many schemes offer more efficient instantiations. A scheme consists of a key generation algorithm EKg that on input of a security parameter l generates a public encryption key epk and corresponding secret decryption key esk, an encryption algorithm Enc that on input of epk, a message msg and a label λ outputs a ciphertext c, and a decryption algorithm Dec that on input of esk, _ and c outputs msg or ⊥ to indicate failure. Correctness requires that Dec(esk, λ, Enc(epk, msg, λ))=msg with probability one for any key pair (epk, esk) ⊏ EKg(l), any l⊏ N and any msg, λ⊏ {0,1}*.

The standard security notion of indistinguishability under adaptive chosen-ciphertext attack (IN D-CCA2) is used here, where the adversary A is given the encryption key epk and adaptive access to a decryption oracle Dec(esk •,•). When A outputs a label $\lambda^*$ and two equal-length messages msg0*, msg1*1, it is given $c^* \sqsubset Enc(pk, msgb^*, \lambda)$ for a random bit b $\sqsubset \{0,1\}$. The adversary wins the game if he outputs b'=b without querying ($\lambda^*$, c*) to the decryption oracle.

One-Time Signature Scheme

A one-time signature scheme consists of three algorithms (OTkg, OTSign, OTVerify) where OTKg, on input of a security parameter l, generates a public verification key otpk and a corresponding secret signing key otsk, OTSign takes as input otsk and a message msg to produce a signature ots, and OTVerify outputs a bit indicating whether a given signature ots is valid with respect to public key otpk and message msg. Correctness requires that OTVerify(otpk, msg, OTSign(otsk, msg))=1 with probability one whenever (otpk, otsk) $\sqsubset$ R OTKg(t) for all 1L N and msg $\sqsubset \{0,1\}$. The scheme is said to be strongly one-time unforgeable if no adversary running in time polynomial in l can, on input of otpk and after a single query msg to a signing oracle OTSign(otsk, •) that returns ots, produce a forgery (msg', ots') such that OTVerify(otpk, msg', ots')=1 and (msg', $\sqsubset$ ') $\sqsubset$ (msg, ots). Any (multiple-time) signature scheme that is strongly unforgeable under chosen-message attack is also a one-time strongly unforgeable scheme, but more efficient constructions exist.

Construction

The following section describes a construction of the SNS based access control system from a group signature scheme (GKg, GSign, GVerify, GOpen), a public-key encryption scheme (EKg, Enc, Dec), and a commitment scheme (CP-Gen, Commit, COpen) with proof system NIZK as follows:

Setup: On input of l, the SNS runs (gpk, gsk1, ..., gskn, ok) $\sqsubset$ R GKg(l, n) where n is an upper bound for the number of users in the SN. It also generates an encryption key pair (epk, esk) $\sqsubset$ R EKg(l) and commitment parameters cpars $\sqsubset$ R CPGen(l). Return skSN= (gsk1, ..., gskn, ok, esk) and pkSN=(gpk, epk, cpars).

Register: When user Ui registers with an SN, the latter simply sends ski=gski to Ui.

OTGen: User Ui generates an owner token ot for a resource res hosted on SP with access control policy plc by generating a one-time signing key pair (otpk, otsk) $\sqsubset$ R OTKg(l), encrypting the policy under SN's public key with label otpk as c $\sqsubset$ Enc(epk, plc, otpk), committing to the resource (cmt, op) $\sqsubset$ R Commit(cpars, res), creating a group signature $\sqsubset$ $\sqsubset$ GSign(gski, (policy, c, cmt, otpk, SP)), and signing ots LR OTSign (otsk, (c, cmt, $\sqsubset$ )). He sends the owner token ot=(c, cmt, $\sqsubset$, otpk, ots) and linking information oli=op to SP.

OTVf: The service provider SP verifies ot=(c, cmt, $\sqsubset$, otpk, ots) with oli=op for resource res by checking that Open(cpars, cmt, res, op)=1, that GVerify(gpk, (policy, c, cmt, otpk, SP), $\sqsubset$ )=1, and that OTVerify(otpk, (c, cmt, $\sqsubset$ ), ots)=1.

RTGen: When a user Uj wants to access a resource res hosted at SP it creates a commitment (cmt, op) $\sqsubset$ R Commit (cpars, res), computes a group signature $\sqsubset$ $\sqsubset$ GSign(gskj, (access, cmt, SP)), and sends requester token rt=(cmt, $\sqsubset$ ) and linking information rli=op to SP.

LTGen: The service provider SP computes the linking token lt as a NIZK PoK that the commitments in the policy and requester token are for the same resource. More precisely, it first verifies requester token rt=(cmt2, $\sqsubset$ 2) with rli=op2 by checking that COpen(cpars, res, cmt2, op2)=1 and by verifying the signature GVerify(gpk, (access, cmt2, SP))=1. If any of these tests fail, it returns Null/not valid, otherwise it uses owner token ot=(c, cmt1, $\sqsubset$ 1, otpk, ots) and oli=op1 to produce lt R NIZK {(res, op1, op2): COpen (cpars, cmt1, res, op1)=1 $\sqsubset$ COpen(cpars, cmt2, res, op2)=1}.

Extract: When the SN receives a owner token ot=(c, cmt1, $\sqsubset$ 1, otpk, ots), a requester token rt=(cmt2, $\sqsubset$ 2), and a linking token lt from resource host SP, it proceeds as follows. If any of the signatures is invalid, i.e., if GVerify (gpk, (policy, c, cmt1, otpk, SP), _1)=0, OTVerify(otpk, (c, cmt1, $\sqsubset$ 1), ots)=0, or GVerify(gpk, (access, cmt2, SP), $\sqsubset$ 2)=0, or if verification of the NIZK PoK lt fails with respect to cmt1, cmt2, then it returns Null/not valid. Otherwise, it opens $\sqsubset$ 1 and $\sqsubset$ 2 as iL GOpen(ok, (policy, c, cmt1, SP), $\sqsubset$ 1) and j $\sqsubset$ GOpen(ok, (access, cmt2, SP), $\sqsubset$ 2). It also decrypts the policy plc $\sqsubset$ Dec(esk, c, otpk). If i=$\sqsubset$ or j=$\sqsubset$ then it returns $\sqsubset$, otherwise it returns (I, j, plc), allowing SN to check whether i and j satisfy the policy plc. If that is the case j is granted access to the resource res by SP. It can be noted that $\sqsubset$ can denote "not valid", "empty", or "false".

OAuth embodiment

In the following, it will be described how an existing SNS can be extended to be an SNS-based access control system by means of web technology. As will be seen, it is possible to achieve the security requirements by utilizing the OAuth 2.0 authorization framework.

In the following, firstly OAuth will be introduced and then the implementation details are given. OAuth 2.0 enables users to authorize third-party access to their online resources by providing a so-called OAuth access token to the third party instead of sharing their actual access credentials (such as their username and password). For example, a user can grant some photo printing service limited access to his, e.g., Google+image gallery by providing the printing service with an access token. Such a token is an opaque string that represents an access authorization issued to the bearing third party. The third party making requests to protected resources on behalf of the user is also called a client in OAuth. OAuth tokens are issued to clients (e.g., SP) by an authorization server (e.g. SN) with the approval of the resource owner (e.g. some user Ui). For security reasons, clients can have to register with the authorization server to obtain authentication credentials consisting of a client identifier and password.

To discuss the security properties of our implementation later on, in the following the five steps of the most common OAuth message flow is outlined:

1. The client initiates the protocol flow by (re-)directing the resource owner's user agent (e.g., hir web browser) to the authorization server. The client includes its client identifier, the requested access scope, and a URL to which the authorization server will redirect the user back once access is granted (or denied).

2. The authorization server authenticates the resource owner via the user agent and establishes whether he grants or denies the client's access request for the given scope.

3. In case the resource owner grants access, the authorization server redirects the user agent back to the client using the redirection URI provided earlier. The redirection URI includes an authorization code.

4. The client requests an access token from the authorization server by providing the server with the authorization code received in the previous step. When making the request, the client includes hir authentication credentials obtained during registration (e.g., with HTTP Basic authentication). The request is made using a server-authenticated channel with Transport Layer Security (TLS).

5. The authorization server authenticates the client and validates the authorization code. If valid, the authorization server responds back with an access token. Implementation In this section, it is described how the SNS can implement a web service endpoint (e.g., a RESTful API) to be used by SP that on input of an owner token ot and an requester token rt returns a boolean answer on whether the policy associated with ot as evaluated under the user identity associated with ot is satisfied with respect to the user identity associated with rt, i.e., 0/1 ⊢ policyEval(ot, rt). We realize rt and ot as OAuth access tokens and use the OAuth protocol as previously described to provide SP with these tokens.

Resource Deposition

For a user Ui to be allowed to deposit some resource with description res (e.g., the resource URL) with SP, he has to provide SP with an owner token ot. With this token, Ui authorizes SP to evaluate some policy plc on his behalf by means of the mentioned service endpoint. To obtain this token, SP executes the OAuth authorization protocol as client with Ui and with SN as authorization server. SP uses the scope policyEval owner to unambiguously indicate to SN and to the user that it requests the generation of an owner token that it wants to use for policy evaluation with SN's service endpoint. During user authentication in step 2, Ui provides SN not only with his credentials (e.g., username and password), but also with the policy plc that shall be associated with the owner token (e.g., by filling out some web form). Before SN returns ot in step 5 of the OAuth ow, it first generates this token as random string with sufficient entropy and associates it in some local database with the authenticated user Ui, the policy plc, and the requested scope. Having received the owner token ot, SP allows to deposit the resource and associates it with res and ot in some local database. Having deposited the resource, Ui sends res to his friends (e.g., by email) so that they can access the resource.

Resource Access

When some user Uj wants to access the resource with description res hosted by SP, the user first has to provide SP with a one-time requester token rt so that SP can make a policy evaluation query. With this token, Uj authorizes SP to involve his identity in a policy check done with SN's service endpoint. To obtain the token, SP executes the OAuth protocol as client with Uj and with SN. SP uses the scope policyEval_requester to indicate to SN and to the user that it requests the generation of a requester token that it wants to use for policy evaluation with SN's service endpoint. Before SN returns rt in step 5 of the OAuth ow, it first generates this one-time token as random string with sufficient entropy and associates it in some local database with both the authenticated user Uj and the requested scope. After SP has obtained the requester token, it retrieves the owner token associated with res and queries SN's policy evaluation end-point (e.g., by means of a HTTP GET request) by using the retrieved owner token and the obtained requester token as query parameters.

Policy Evaluation

Upon receiving a policy evaluation query on its web service endpoint from SP, SN retrieves from its local database the user identities Ui and Uj and the scopes so and sr that are associated with the provided owner and requester token, respectively. It also retrieves the policy plc associated with the owner token from this database. Afterwards, SN checks whether so and sr equal policyEval$_{13}$ owner and policyEval_requester, respectively. If the tokens are valid, the scopes match, and the requester token has not been used before, SN evaluates plc under Ui's identity (i.e., as if Ui would execute the query himself while being logged in) which query results in a set of user identities. Finally, SN responds to SP in a boolean fashion whether Uj is member of this set and marks rt as used. If one of the tokens is not valid or the scopes do not match, SN aborts the transaction. If the service request was authenticated, SN can optionally deny the authenticated party future access to the service endpoint.

Figure 3:
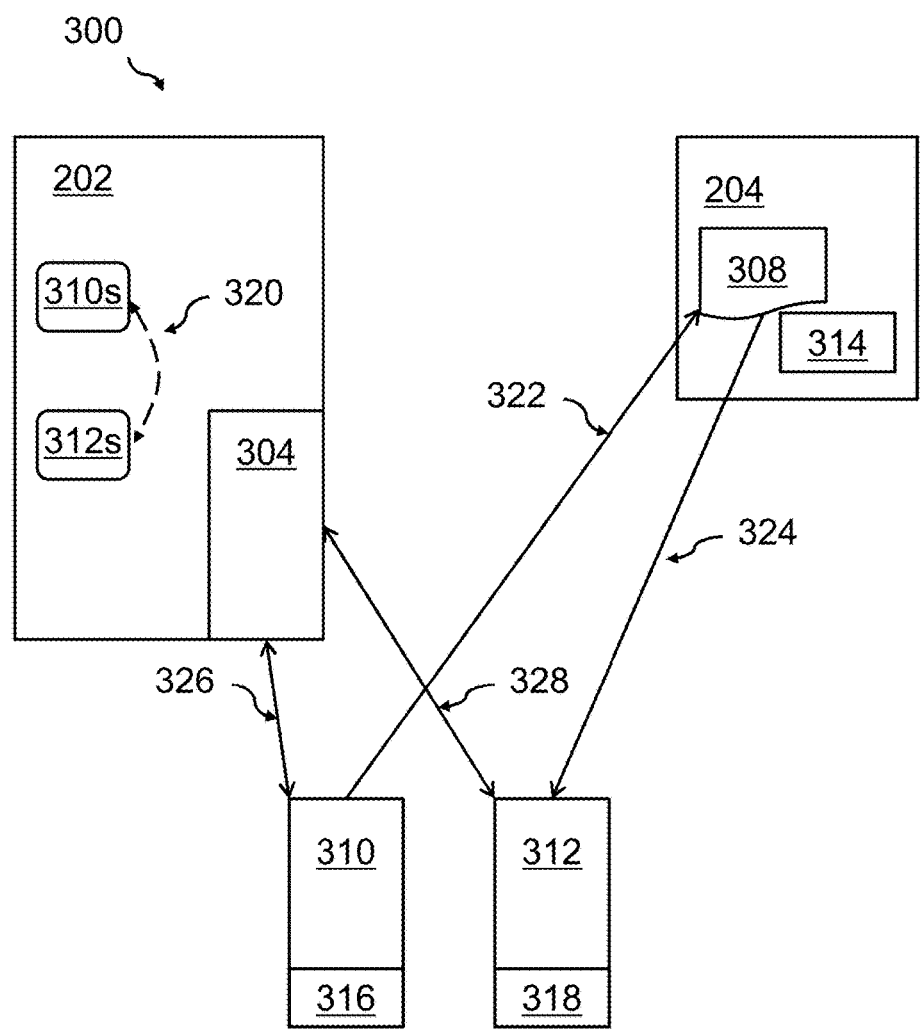
FIG. 3 shows a more detailed block diagram of involved components and message flows.

FIG. 3 shows a block diagram 300 of involved entities: a SNS 202, a resource computer system 204 having stored the resource 308, an owner system 310, and a requester system 312. If a user can register for the SNS 202 a profile 310s can be generated. This can apply for any user of the SNS 202, including another user, he had named requester. The requester's profile or identity can be named 312s. Both, the user and the requester can use their own computer systems, namely, an owner system 310 and a requester system 312. Using these systems, the owner and the requester can access the SNS 202. In the SNS 202, the owner can define the relationship 320 to the requester identifiable by the requester profile 312s. The relationship 320 can become part of the profile of the user or owner profile 310s.

Additionally, the SNS 202 can include an access controller 304. Under control of the access controller 304 each user—including the owner and the requester—can receive, 326, 328, at their respective systems 310 and 312 any user specific secret group signing key 316, 318. These keys can have to be stored on the owner system 310 and the requester system 312 not allowing access to these user specific secret group signing keys 316, 318 by others. They have to be kept as a secret. As an example, the SNS 202 can be, e.g., Facebook, LinkedIn, XING or any other SNS. The SNS can be deployed as a cloud computing system and can be distributed over a plurality of different computer systems.

The owner of resource 308, e.g., a text file or a picture or a video or any other storable resource can be uploaded, 322, from the owner system 310 or, from another storage location via the owner system 310, to the resource computer system 204. In addition to the resource 308 itself an owner token 314 can be stored on the resource computer system 204 and linked to the resource 308. The resource 308 cannot be accessed by a requester system 312 directly. However, on request 324 of the requester system 312, an access control procedure involving a certain protocol with the access controller 304 of the SNS 202 can be executed. Thus, no direct access control mechanism on the side of the resource computer system 206 has to be used. Instead, access control policies stored within the SNS 202 and controlled by the access controller 304 can also be used for controlling access to the resource 308 on the resource computer system 204.

Figure 4:
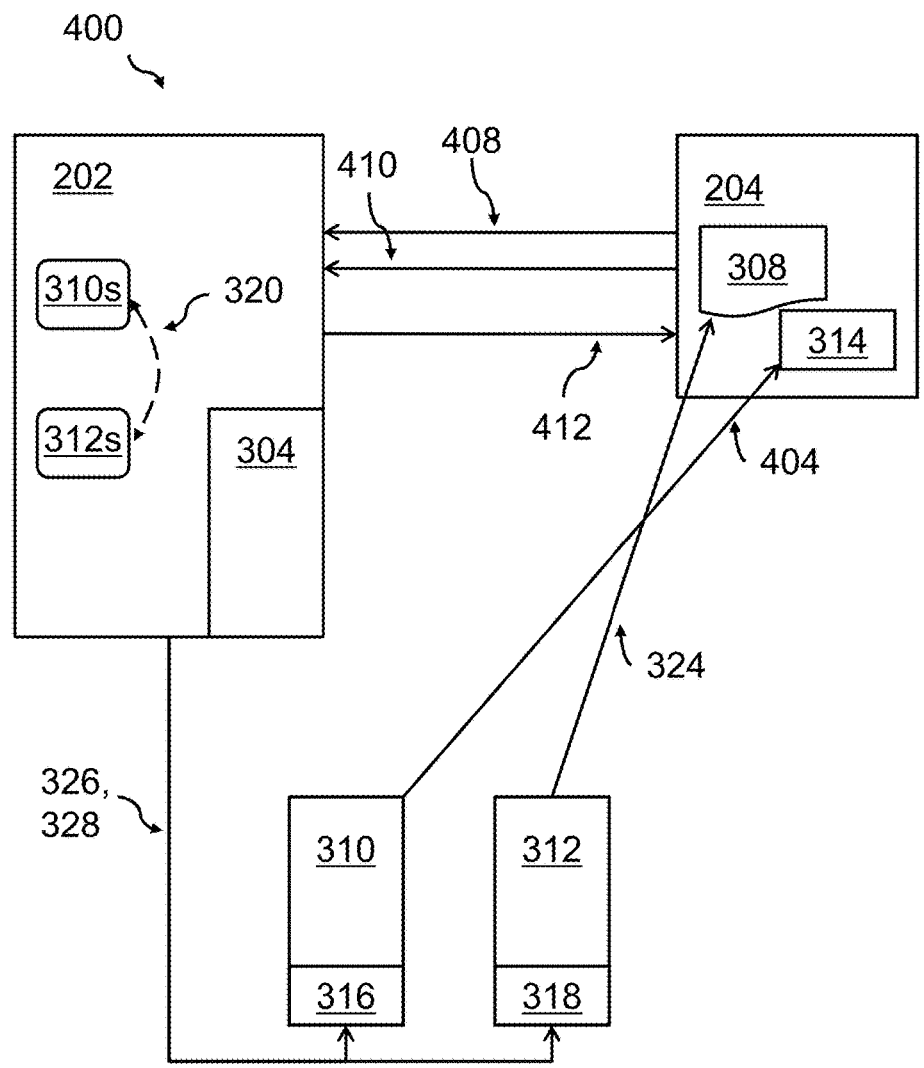
FIG. 4 shows another detailed block diagram of involved components and message flows.

An additional detailed message flow 400 is shown using FIG. 4. From the owner system 312, an owner token can be stored on the resource computer system 204 including an access policy to the resource 308 (compare 404). The requesting system 312 can send, 406, a requester token to the resource computer system 204 and request access to the resource 308. But no direct access can be granted to the requester system 308. Instead, the requester system sends, 410, the owner token including the access control policy together with the requester token (compare 408) to the SNS 202. Here, based on the owner token and the requester token, the identities of the owner and the requester are determined. Additionally, the access policy can be determined based on the owner token and the defined relationships 320 between the owner identity and the requester identity with the SNS 202. If the access control policy can be confirmed by the access controller 304, and in case of a positive determination for access to the resource by the requester system 312, an access grant confirmation signal 412 can be sent from the SNS 202 via the access controller 304 to the resource computer. This then can grant access to the resource 308 by the requester computer system 312.

Figure 5:
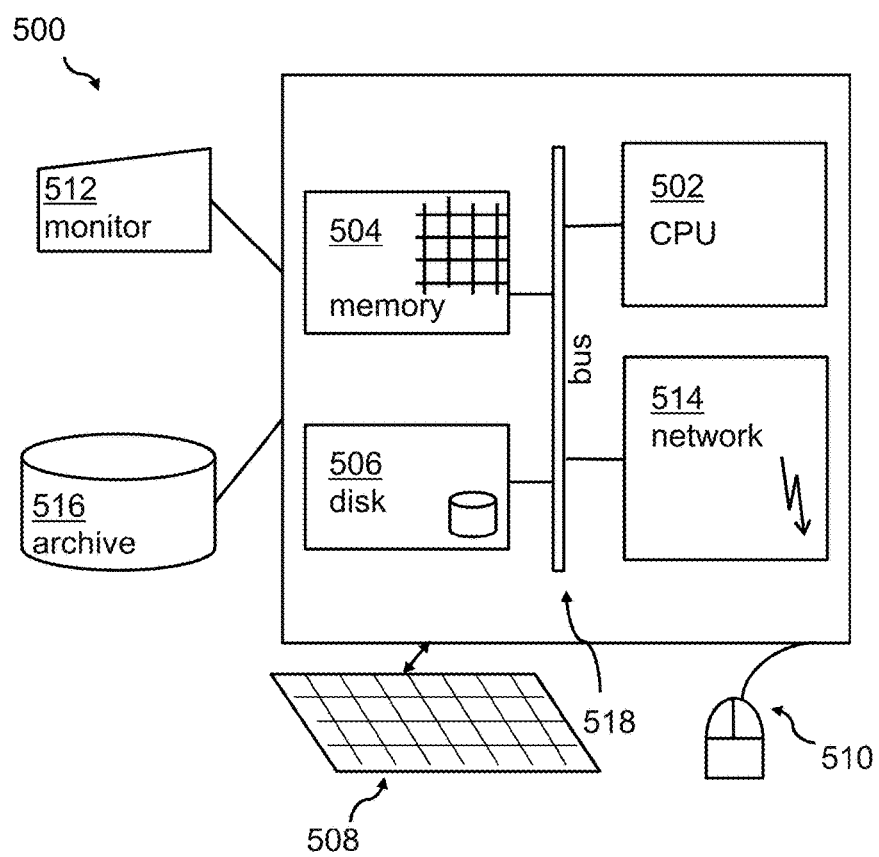
FIG. 5 shows a block diagram of a computer system being used in the context of the method.

Embodiments of the invention can be implemented together with virtually any type of mobile device or mobile computer, regardless of the platform being suitable for storing and/or executing program code. Suitable as owner system 310 and requestor system 312 are in particular mobile devices or mobile computing devices like smartphones. The computer discussed from here on can also include elements as discussed in the context of FIG. 2, 3, 4. For example, as shown in FIG. 5, a computing system 500, e.g., a mobile device, can include one or more processor(s) 502 with one or more cores per processor, associated memory elements 504, an internal storage device 506 (e.g., a hard disk, an optical drive such as a compact disk drive or digital video disk (DVD) drive, a flash memory stick, etc.), and numerous other elements and functionalities, typical of today's computers (not shown). The memory elements 504 can include a main memory, e.g., a random access memory (RAM), employed during actual execution of the program code, and a cache memory, which can provide temporary storage of at least some program code and/or data in order to reduce the number of times, code and/or data must be retrieved from a long-term storage medium or external bulk storage 516 for an execution. In smartphones long-term bulk storage can be implemented as smartcards, SD cards (SD=Secure Digital) or, microSD card. Elements inside the computer 500 can be linked together by means of a bus system 518 with corresponding adapters.

The computing system 500 can also include input means, such as a keyboard 508, a pointing device such as a mouse 510, and/or a microphone and a speaker (not shown). Alternatively, the computing system can be equipped with a touch sensitive screen 512 as main input and output device. Furthermore, the computer 500, can include output means, such as a monitor or screen 512 [e.g., a liquid crystal display (LCD), a plasma display, a light emitting diode display (LED), or cathode ray tube (CRT) monitor]. The computer system 500 can be connected to a network (e.g., a local area network (LAN), a wide area network (WAN), such as the Internet or any other similar type of network, including wireless networks via a network interface connection 514. This can allow a coupling to other computer systems or a storage network or a tape drive or a mobile telephone network. Those, skilled in the art will appreciate that many different types of computer systems exist, and the aforementioned input and output means can take other forms. Generally speaking, the computer system 500 can include at least the minimal processing, input and/or output means, necessary to practice embodiments of the invention.

While the invention has been described with respect to a limited number of embodiments, those skilled in the art, having benefit of this disclosure, will appreciate that other embodiments can be devised, which do not depart from the scope of the invention, as disclosed herein. Accordingly, the scope of the invention should be limited only by the attached claims. Also, elements described in association with different embodiments can be combined. It should also be noted that reference signs in the claims should not be construed as limiting elements.

As will be appreciated by one skilled in the art, aspects of the present disclosure can be embodied as a system, method or computer program product. Accordingly, aspects of the present disclosure can take the form of an entirely hardware embodiment, an entirely software embodiment (including firmware, resident software, micro-code, etc.) or an embodiment combining software and hardware aspects that can all generally be referred to herein as a "circuit," "module" or "system." Furthermore, aspects of the present disclosure can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electromagnetic, optical, or any suitable combination thereof. A computer readable signal medium can be any computer readable medium that is not a computer readable storage medium and that can communicate, propagate, or transport a program for use by or in connection with an instruction execution system, apparatus, or device.

Program code embodied on a computer readable medium can be transmitted using any appropriate medium, including but not limited to wireless, wire-line, optical fiber cable, RF, etc., or any suitable combination of the foregoing.

Computer program code for carrying out operations for aspects of the present invention can be written in any combination of one or more programming languages, including an object oriented programming language such as Java, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

Aspects of the present disclosure are described with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer readable medium that can direct a computer, other programmable data processing apparatus, or other devices to function in a particular manner, such that the instructions stored in the computer readable medium produce an article of manufacture including instructions, which implement the function/act specified in the flowchart and/or block diagram block or blocks.

The computer program instructions can also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus provide processes for implementing the functions/acts specified in the flowchart and/or block diagram block or blocks.

The block diagrams in the Figures illustrate the architecture, functionality, and operation of possible implementations of systems, methods and computer program products according to various embodiments of the present disclosure. In this regard, each block in the block diagrams can represent a module, segment, or portion of code, which includes one or more executable instructions for implementing the specified logical function(s). It should also be noted that, in some alternative implementations, the functions discussed hereinabove can occur out of the disclosed order. For example, two functions taught in succession can, in fact, be executed substantially concurrently, or the functions can sometimes be executed in the reverse order, depending upon the functionality involved. It will also be noted that each block of the block diagrams, and combinations of blocks in the block diagrams, can be implemented by special purpose hardware-based systems that perform the specified functions or acts, or combinations of special purpose hardware and computer instructions.

The terminology used herein is for the purpose of describing particular embodiments only and is not intended to limit of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiment was chosen and described in order to best explain the principles of the invention and the practical application, and to enable others of ordinary skills in the art to understand the invention for various embodiments with various modifications, as are suited to the particular use contemplated.

The invention claimed is:

1. A computer-implemented method, comprising:
receiving, by a social networking system operatively coupled to a processor, a requestor token and an owner token from a resource computer system communicatively coupled to the social networking system, wherein the requestor token comprises an encrypted resource requester identity generated for a second user requesting access to a resource owned by a first user on the resource computer system, and the owner token comprises an encrypted resource owner identity generated for the first user and an encrypted access control policy;
determining by the social networking system, whether access to the resource by the second user is to be granted based on the encrypted resource requester identity, the encrypted resource owner identity, and the encrypted access control policy;
sending, by the social networking system, a signal to the resource computer system indicating a result of the determining whether the access to the resource by the second user on is to be granted.

2. The computer-implemented method of claim 1, wherein the access control policy is not decryptable by the resource computer system.

3. The computer-implemented method of claim 1, further comprising:
generating, by the social networking system, the owner token; and
sending, by the social networking system, the owner token to an owner system associated with the first user.

4. The computer-implemented method of claim 1, further comprising:
decrypting, by the social networking system, the encrypted resource owner identity, the encrypted resource requester identity, and the encrypted access control policy;
evaluating the decrypted access control policy on the basis of the decrypted resource owner identity and the decrypted resource requester identity to determine whether access to the resource by the second user is to be granted.

5. The computer-implemented method of claim 3, further comprising:
encrypting, by the social networking system, a resource owner identity using a first secret group signing key to generate the encrypted resource owner identity; and
encrypting, by the social networking system, an access control policy using the first secret group signing key to generate the encrypted access control policy.

6. The computer-implemented method of claim 1, further comprising:
generating, by the social networking system, the requester token; and
sending, by the social networking system, the requester token to a requester system associated with the second user.

7. The computer-implemented method of claim 6, further comprising encrypting, by the social networking system, a resource requester identity using a second secret group signing key to generate the encrypted resource requester identity.

8. The computer-implemented method of claim 1, further comprising:
receiving, by the social networking system, a linking token from the resource computer system, wherein the linking token comprises information verifying that the owner token and the requester token are related to the resource; and
wherein the determining whether access to the resource by the second user is to be granted comprises authenticating the linking token.

9. A social networking system, comprising:
a memory that stores computer executable components; and
a processor that executes the computer executable components stored in the memory, wherein the computer executable components comprise:
an access controller configured to:
receive a requestor token and an owner token from a resource computing system communicatively coupled to the social networking system, wherein the requestor token comprises an encrypted resource requester identity generated for a second user requesting access to a resource owned by the first user on the resource computer system, and the owner token comprises an encrypted resource owner identity generated for the first user and an encrypted access control policy;
determine whether access to the resource by the second user is to be granted based on the encrypted resource requester identity, the encrypted resource owner identity, and the encrypted access control policy;
send a signal to the resource computer system indicating a result of the determination of whether the access to the resource by the second user on is to be granted.

10. The social networking system of claim 9, wherein the access controller is further configured to:
receive a linking token from the resource computer system, wherein the linking token comprises information verifying that the owner token and the requester token are related to the resource; and
authenticate the linking token as part of the determination of whether access to the resource by the second user is to be granted.

11. A computer program product facilitating controlling access to a resource of a resource computer system, wherein the resource is owned by a first user, the computer program product comprising a non-transitory computer readable medium having program instructions embodied therewith, the program instructions executable by a social networking system communicatively coupled to the resource computer system to cause the social networking system to:
receive a requestor token from a resource computing system communicatively coupled to the social networking system, wherein the requestor token comprises an encrypted resource requester identity generated for a second user requesting access to a resource owned by the first user on the resource computer system, and the owner token comprises an encrypted resource owner identity generated for the first user and an encrypted access control policy;
determine whether access to the resource by the second user is to be granted based on the encrypted resource requester identity, the encrypted resource owner identity, and the encrypted access control policy;
send a signal to the resource computer system indicating a result of the determination of whether the access to the resource by the second user on is to be granted.

12. The computer program product of claim 11, wherein the program instructions are further executable to cause the social networking system to:
receive a linking token from the resource computer system, wherein the linking token comprises information verifying that the owner token and the requester token are related to the resource; and
authenticate the linking token as part of the determination of whether access to the resource by the second user is to be granted.

13. A computer program product facilitating controlling access to a resource of a resource computer system, wherein the resource is owned by a first user, the computer program product comprising a non-transitory computer readable medium having program instructions embodied therewith, the program instructions executable by the resource computer system communicatively coupled to a social networking system to cause the resource computer system to:
send a requestor token and an owner token to the social networking system, wherein the requestor token comprises an encrypted resource requester identity generated for the second user requesting access to the resource owned by the first user, and the owner token comprises an encrypted resource owner identity generated for the first user and an encrypted access control policy;
receive a signal from the social networking system indicating whether access to the resource by the second user is to be granted based on the encrypted resource requester identity, the encrypted resource owner identity, and the encrypted access control policy;
control access to the resource by the second user based on the signal.

14. The computer program product of claim 13, wherein the program instructions are further executable to cause the resource computer system to:
receive a requestor token from a requestor system communicatively coupled to the resource computer system, wherein the requestor token comprises an encrypted resource requester identity generated for the second user requesting access to the resource owned by the first user.

15. A resource computer system, comprising:
a memory that stores computer executable components; and
a processor that executes the computer executable components stored in the memory to:
send a requestor token and an owner token to a social networking system communicatively coupled to the resource computer system, wherein the requestor token comprises an encrypted resource requester identity generated for the second user requesting access to the resource owned by the first user, and the owner token comprises an encrypted resource owner identity generated for the first user and an encrypted access control policy;
receive a signal from the social networking system indicating whether access to the resource by the second user is to be granted based on the encrypted resource requester identity, the encrypted resource owner identity, and the encrypted access control policy;

control access to the resource by the second user based on the signal.

16. The resource computer system of claim 15, wherein the processor further executes the computer executable components stored in the memory to:
    authenticate the requester token;
    generate a linking token that comprises information verifying that the owner token and the requester token are related to the resource;
    send the linking token to the social networking system.

17. The resource computer system of claim 15, wherein the processor further:
    receives the requester token and the owner token from a requestor system communicatively coupled to the resource computer system, wherein the requestor token comprises an encrypted resource requester identity generated for the second user requesting access to the resource owned by the first user.

18. A computer-implemented method comprising:
    sending, by a resource computer system operatively coupled to a processor, a requestor token and an owner token to a social networking system communicatively coupled to the resource computer system wherein the requestor token comprises an encrypted resource requester identity generated for the second user requesting access to the resource owned by the first user, and the owner token comprises an encrypted resource owner identity generated for the first user and an encrypted access control policy;
    receiving, by the resource computer system, a signal from the social networking system indicating whether access to the resource by the second user is to be granted based on the encrypted resource requester identity, the encrypted resource owner identity, and the encrypted access control policy;
    controlling, by the resource computer system, access to the resource by the second user based on the signal.

19. The computer-implemented method of claim 18, further comprising receiving, by the resource computer system, a requester token from a requestor system communicatively coupled to the resource computer system, wherein the requestor token comprises an encrypted resource requester identity generated for the second user requesting access to the resource owned by the first user.

20. The computer-implemented method of claim 18, further comprising:
    authenticating, by the resource computer system, the requester token;
    generating, by the resource computer system, a linking token that comprises information verifying that the owner token and the requester token are related to the resource;
    sending, by the resource computer system, the linking token to the social networking system.

* * * * *